(12) United States Patent
Nakamura et al.

(10) Patent No.: US 6,621,537 B1
(45) Date of Patent: *Sep. 16, 2003

(54) ACTIVE MATRIX LIQUID CRYSTAL DISPLAY AND MANUFACTURING METHOD OF THE SAME

(75) Inventors: Nobuhiro Nakamura, Kumamoto (JP); Kouji Yabushita, Kumamoto (JP); Osamu Ito, Kumamoto (JP)

(73) Assignee: Advanced Display Inc., Kikuchi-gun (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/412,758

(22) Filed: Oct. 5, 1999

(30) Foreign Application Priority Data

Oct. 7, 1998 (JP) ............................................. 10-285206

(51) Int. Cl.⁷ ............................................... G02F 1/136
(52) U.S. Cl. ........................... 349/43; 349/39; 349/147; 349/149; 349/139; 438/30
(58) Field of Search ................................. 349/38, 39, 42, 349/43, 149, 41, 44, 46, 139, 143, 147; 438/30

(56) References Cited

U.S. PATENT DOCUMENTS

| | | | | |
|---|---|---|---|---|
| 5,162,933 A | * | 11/1992 | Kakuda et al. | 359/59 |
| 5,247,289 A | * | 9/1993 | Matsueda | 345/98 |
| 5,283,566 A | * | 2/1994 | Mimura et al. | 345/211 |
| 5,446,568 A | * | 8/1995 | Nakazawa et al. | 349/149 |
| 5,488,498 A | * | 1/1996 | Fujii et al. | 349/149 |
| 5,734,450 A | * | 3/1998 | Irie et al. | 349/39 |
| 6,208,390 B1 | * | 3/2001 | Ejiri et al. | 349/43 |
| 6,411,350 B2 | * | 6/2002 | Ejiri et al. | 349/43 |

* cited by examiner

*Primary Examiner*—Kenneth Parker
*Assistant Examiner*—David Chung
(74) *Attorney, Agent, or Firm*—Oblon, Spivak, McClelland, Maier & Neustadt, P.C.

(57) ABSTRACT

An electrooptical element used in liquid crystal display accordance to this invention is provided with a storage capacitance wiring group and collective drawing wiring. At the time of wet etching of transparent conductor film of pixel electrodes, all wiring of the storage capacitance wiring group are electrically separated each other, and after wet etching of the pixel electrodes, all of the storage capacitance wiring group are electrically connected with collective drawing wiring. The capacitance value of the storage capacitance wiring is small at the time of wet etching of the pixel electrodes, thus preventing the corrosion of the storage capacitance wiring.

10 Claims, 10 Drawing Sheets

ACTIVE MATRIX LIQUID CRYSTAL DISPLAY AND MANUFACTURING METHOD OF THE SAME

BACKGROUND OF THE INVENTION

The present invention relates to a method for manufacturing an active matrix type liquid crystal display apparatus (TFT-LCD) employing thin film transistors (TFTs) as switching elements. More particularly, the present invention has been made for the sake of preventing corrosion of an storage capacitance wiring group during a successive transparent conductive layer etching process in case a metal material of high corrosiveness is employed for the storage capacitance wiring group or collective drawing wiring.

Electrooptical elements employing liquid crystal are actively being applied for use in displays. Electrooptical elements employing liquid crystal are generally arranged in that liquid crystal is interposed between two upper and lower substrates comprised with electrodes which are further interposed by upper and lower polarizing plates, and in case the electrooptical elements are of transmitting type, a back light is additionally arranged in the rear. So-called alignment is performed for the surfaces of the upper and lower electrode substrates, and directors that are average directions of the liquid crystal molecules can be controlled to provide desired initial conditions. Since liquid crystal presents birefringence, light that has been made incident through the polarizing plate from the back light is changed to elliptical polarization through the birefringence and is made incident to the polarizing plate on the opposite side. In case voltage is impressed between the upper and lower electrodes in this condition, the arranging condition of the directors is changed, resulting in a change in the birefringence rate of the liquid crystal layer, in a change in the condition of elliptic polarization made incident to the polarizing plate on the opposite side, and further in a change in the light intensity and spectrum transmitting through the electrooptical elements. While this electrooptical effect is varied by factors such as the type of liquid crystal layer to be employed, initial orientation condition, direction of the polarizing axis of the polarizing plate, thickness of liquid crystal layer or the color filter or various interference filter that are arranged in the path of the transmitting light, these are reported in details in prior art references. Generally, there are employed arrangements known as TN or STN using nematic liquid crystal layers.

Electrooptical elements for displays using liquid crystal may be divided into simple matrix type ones and TFT-LCDs employing TFTs as switching elements. In view of portability and display quality, TFT-LCDs which present superior characteristics than CRTs or simple matrix type liquid crystal display devices are widely applied to note-type personal computers, for example. A TFT-LCD is generally arranged in that liquid crystal is interposed between a TFT array substrate in which TFTs are formed in a form of an array and an opposing substrate formed with a color filter and with common electrodes, this being further interposed between upper and lower polarizing plates, and a back light is further arranged in the rear. Such an arrangement makes it possible to present favorable color displaying characteristics.

For applying voltage on liquid crystal in a TFT-LCD, the TFTs are switched ON within a selected time for the gate lines, charge is applied to pixel electrodes from a source wiring, and the potential of the pixels are made to be identical with those of the source wiring. In case the gates are in a non-selected condition thereafter, the TFTs are set into an OFF condition. While the charge of the pixels is maintained in this condition, the electric charge of the pixels is actually decreased owing to leakage current of the TFTs or within the liquid crystal so that the potential of the pixels is consequently decreased. In order to prevent such variations in the pixel potential, it is general that an storage capacitance is provided so that the amount of variation in the pixel potential with respect to variations in the unit electric charge is kept small. The storage capacitance may be roughly divided into those arranged by gates and pixel electrodes (additional capacity type) and those arranged by an exclusive wiring and pixel electrodes (storage capacitance wiring type). While an additional capacity type is advantageous in that the aperture ratio can be made large since it is not required for the provision of an exclusive wiring unlike storage capacitance wiring types, the current load becomes large since the gate wiring concurrently serve as an storage capacitance wiring. Since the total sum of wiring resistance and storage capacitance becomes large in a large-sized panel, it is general to employ an storage capacitance wiring for the sake of decreasing the load of the gate wiring. A conceptual diagram of a TFT array substrate employing an storage capacitance wiring is shown in FIG. 10. In the drawing, 1 denotes gate wiring, 8 source wiring, 3 storage capacitance wiring, 10a and 10b collective drawing wiring for impressing voltage on the storage capacitance wiring. On the other hand, it is being attempted to employ wiring materials of low resistance for the sake of decreasing the wiring resistance. In case of employing Al or Al alloys such as AlSiCu or AlCu for the gate wiring in reversed stagger type TFTs and storage capacitance wiring, it may be that hillocks are generated at the time of forming an insulating film on the wiring pattern or that this insulating film is corroded in a succeeding process by the use of strong acid employed at the time of performing pixel pattern etching. In order to eliminate such troubles, it has been attempted in prior art to prevent hillocks by covering the wiring of Al or one of the above noted Al alloys by a metal pattern of high melting point such as Cr or Mo or to prevent hillocks or corrosion through strong acid by performing anodic oxidation of Al or Al alloys. However, the increase in number of photolithographic processes to be performed or the additional step of performing anodic oxidation results in inferior productivity. On the other hand, it has also been attempted to employ Al alloys such as AlZr or AlTa for preventing hillocks, but this resulted in a drawback in that the resistivity was increased to be substantially identical with those of metals of high melting points such as Cr. It has recently been developed of a wiring material as disclosed in Japanese Patent No. 2733006 wherein it is mentioned that with AlNd, hillocks can be prevented without being accompanied by increases in resistivity unlike AlZr as described earlier. It will now been explained for a method of manufacturing a TFT array substrate as shown in FIG. 8 and FIG. 9 which has been manufactured through conventional methods by using AlNd for the gate wiring and storage capacitance wiring.

After forming AlNd onto a glass substrate through spattering to a thickness of 200 nm, wet etching is performed by using a mixed liquid of phosphoric acid, acetic acid and nitric acid to form gate wiring 1, storage capacitance electrodes 2 and storage capacitance wiring 3. At this time, the storage capacitance wiring was connected to a collective drawing wiring 3a on the reverse side of gate terminals. Then, there are successively formed, through plasma CVD, SiN to a thickness of 400 nm as a gate insulating film 4, amorphous Si of 150 nm as a semiconductor layer, and a P doped amorphous Si impurity layer of 30 nm, and a semiconductor pattern 5 is formed on the gate wiring by patterning the impurity layer and semiconductor layer. Thereafter, pixel electrodes 6 are obtained by forming a pixel electrode film to a thickness of 100 nm, which is patterned by a mixed acid of hydrochloric acid and nitric acid or the like. Contact holes 7a are formed through the gate insulating film at an end of the storage capacitance wiring on the side of the gate terminal. After successively forming Cr to a thickness of 400 nm for forming source wiring 8 and drain electrodes 9, patterning is performed. The impurity layer at a channel portion is then removed through dry etching. Finally, SiN is formed to a thickness of 400 nm as a protecting film 11, and SiN at the terminal portion is removed.

In case a film deficit exists in the gate insulating film 4, corrosion and disconnection occurs owing to strong acid employed for performing etching of the pixel electrodes. Recent improvements in film forming devices have enabled to decrease dust whereby large film deficits are hardly generated in gate insulating films. However, in case of minute deficits in gate insulating films or poor coverage of the gate insulating film at the edge step portions of the gate wirings when gate wirings are covered by the gate insulating film, may result in corrosion of the wiring. As explained so far, such problems of disconnection of wiring owing to corrosion need to be considered in case of employing recently developed wiring materials of low resistance and capable of preventing hillocks as common storage capacitance wiring.

Especially, disconnection of common storage capacitance wiring needs to be avoided to the utmost, since the provision of inputting storage capacitance wiring signals from both ends of the wiring makes it impossible to electrically detect disconnection so that pixels of corresponding gate lines present bright line defects at the time the panel is switched ON. As for the storage capacitance wiring and collective drawing wiring pattern, Japanese Patent Application Laid-Open Publication No. 3-72321 (1991) discloses an example wherein an storage capacitance wiring is electrically charged by collective drawing wirings provided at both ends of the panel for improving signal delays of storage capacitance wiring (reference should be made to FIG. 10). However, no reference is made to corrosion of storage capacitance wiring at the time of performing wet etching of a transparent conductive layer which may be problematic in case of employing a metal such as Al for the storage capacitance wiring that is apt to be corroded. Further, Japanese Patent Application Laid-Open Publication No. 7-36061 (1995) discloses an example of a pattern for storage capacitance wiring and collective drawing wiring including patterning of a transparent conductive layer. This reference does also not refer to corrosion of storage capacitance wiring at the time of performing wet etching of a transparent conductive layer which may be problematic in case of employing a corrosive metal such as Al for the storage capacitance wiring.

As described so far, it is an object of the present invention to prevent corrosion and disconnection of storage capacitance wiring generated at the time of performing wet etching of transparent conducive layer in case of employing a corrosive metal such as Al for the storage capacitance wiring.

SUMMARY OF THE INVENTION

The electrooptical element according to the present invention as claimed in claim 1 is arranged in that an electrooptical material is interposed between a pair of substrates arranged in an opposing manner wherein one of the substrates comprises thereon a gate wiring, an storage capacitance wiring group formed on a same layer as the gate wiring and formed of one of corrosive metals or of a multi-layered metal including at least one of these metals that underwent corrosion preventing treatments by being separated from each other, a gate insulating layer formed on the substrate so as to cover the gate wiring and the storage capacitance wiring group, TFTs formed on the gate insulating layer, pixel electrodes electrically connected to the TFTs, source wiring intersecting with the gate wiring and provided on the substrate via the gate insulating layer and collective drawing wiring formed on the gate insulating layer for mutually connecting all of each of the storage capacitance wiring group in an electrical manner through contact holes provided on the gate insulating layer.

The electrooptical element according to the present invention as claimed in claim 2 is arranged in that an electrooptical material is interposed between a pair of substrates arranged in an opposing manner wherein one of the substrates comprises thereon a gate wiring, an storage capacitance wiring group and collective drawing wiring formed on a same layer as the gate wiring and formed of one of corrosive metals or of a multi-layered metal including at least one of these metals that underwent corrosion preventing treatments by being separated from each other, a gate insulating layer formed on the substrate so as to cover the gate wiring, the storage capacitance wiring group and the collective drawing wiring, TFTs formed on the gate insulating layer, pixel electrodes electrically connected to the TFTs, source wiring intersecting with the gate wiring and provided on the substrate via the gate insulating layer and a metallic pattern formed on the gate insulating layer for mutually connecting all of each of the storage capacitance wiring group and the collective drawing wiring in an electrical manner through contact holes provided on the gate insulating layer.

The electrooptical element according to the present invention as claimed in claim 3 is characterized in that the storage capacitance wiring group of claim 1 is made of Al, Al alloy or a multi-layered metal including at least one of them.

The electrooptical element according to the present invention as claimed in claim 4 is characterized in that the storage capacitance wiring group and the collective drawing wiring are made of Al, Al alloy or a multi-layered metal including at least one of them.

The electrooptical element according to the present invention as claimed in claim 5 is characterized in that it is arranged in that a pattern is formed between the storage capacitance wiring group and the collective drawing wiring of claim 2 facing to each other in a protruding manner.

The electrooptical element according to the present invention as claimed in claim 6 is arranged in that an electrooptical material is interposed between a pair of substrates arranged in an opposing manner wherein one of the substrates comprises thereon a gate wiring, an storage capacitance wiring group formed on a same layer as the gate wiring and formed of one of corrosive metals or a of multi-layered metal including at least one of these metals that underwent corrosion preventing treatments by being separated from each other, a gate insulating layer formed on the substrate so as to cover the gate wiring and the storage capacitance wiring group, TFTs formed on the gate insulating layer, pixel electrodes electrically connected to the TFTs, source wiring intersecting with the gate wiring and provided on the substrate via the gate insulating layer, a protecting insulating layer formed so as to cover thin film transistors formed on the gate insulating layer and a collective drawing wiring formed on the protecting insulating layer for mutually connecting all of each of the storage capacitance wiring group in an electrical manner through contact holes provided on the gate insulating layer and the protecting insulating layer, wherein the collective drawing wiring is formed of a same material as transfer electrodes formed at a portion that is interposed between the substrate and the opposing substrate for supplying opposing substrate an electrical potential from the substrate to the opposing substrate.

The method for manufacturing electrooptical elements according to the present invention as claimed in claim 7 is characterized in that there are respectively taken the steps of arranging a gate wiring on a substrate, arranging an storage capacitance wiring group formed of one of corrosive metals or of a multi-layered metal film including at least one of these metals that underwent corrosion preventing treatments by being separated from each other, forming a gate insulating layer on the substrate so as to cover the gate wiring and the storage capacitance wiring group, forming a transparent conductive layer on the gate insulating layer, wherein there are further taken the step of forming contact holes on the insulating layer after performing wet etching of the transparent conductive layer, arranging a source wiring which intersects with the gate wiring and is provided on the substrate at least via the gate insulating layer and forming a collective drawing wiring on the substrate for mutually connecting all of each of the storage capacitance wiring group in an electrical manner through the contact holes.

The method for manufacturing electrooptical elements according to the present invention as claimed in claim 8 is characterized in that there are respectively taken the steps of arranging a gate wiring on a substrate, arranging an storage capacitance wiring group and a collective drawing wiring of one of corrosive metals or of a multi-layered metal film including at least one of these metals that underwent corrosion preventing treatments by being separated from each other, forming a gate insulating layer on the substrate so as to cover the gate wiring, the storage capacitance wiring group and the collective drawing wiring, and forming a transparent conductive layer on the gate insulating layer, wherein there are further taken the steps of forming contact holes on the insulating layer after performing wet etching of the transparent conductive layer, arranging a source wiring which intersects with the gate wiring and is provided on the substrate at least via the gate insulating layer and arranging a metal pattern for mutually connecting all of each of the storage capacitance wiring group and the collective drawing wiring in an electrical manner through the contact holes.

The method for manufacturing electrooptical elements according to the present invention as claimed in claim 9 is characterized in that the storage capacitance wiring group of claim 7 is made of Al, Al alloy or a multi-layered metal including at least one of them.

The method for manufacturing electrooptical elements according to the present invention as claimed in claim 10 is characterized in that the storage capacitance wiring group and the collective drawing wiring of claim 8 are made of Al, Al alloy or a multi-layered metal including at least one of them.

The method for manufacturing electrooptical elements according to the present invention as claimed in claim 11 is characterized in that it further includes the steps of arranging patterns that are formed in a protruding manner at one end portion of the storage capacitance wiring group of claim 8, and further arranging protruding patterns at a portion of the collective drawing wiring facing the protruding pattern provided at the storage capacitance wiring group.

The method for manufacturing electrooptical elements according to the present invention as claimed in claim 12 is characterized in that there are respectively taken the steps of arranging a gate wiring on a substrate, arranging an storage capacitance wiring group of corrosive metals or of a multi-layered metal film including at least one of these metals that underwent corrosion preventing treatments by being separated from each other, forming a gate insulating layer on the substrate so as to cover the gate wiring and the storage capacitance wiring group, and forming a transparent conductive layer on the gate insulating layer, wherein there are further taken the steps of forming contact holes on the gate insulating layer after performing wet etching of the transparent conductive layer, and arranging a source wiring which intersects with the gate wiring and is provided on the substrate at least via the gate insulating layer, forming a protecting insulating layer as to cover the source wiring, forming contact holes on the gate insulating layer and the protecting insulating layer, and forming a collective drawing wiring for mutually connecting all of each of the storage capacitance wiring group in an electrical manner through contact holes formed of a same material as transfer electrodes formed at a portion that is interposed between the substrate and the opposing substrate for supplying opposing substrate an electrical potential from the substrate to the opposing substrate.

DETAILED DESCRIPTION

Embodiment 1

Figure 1:
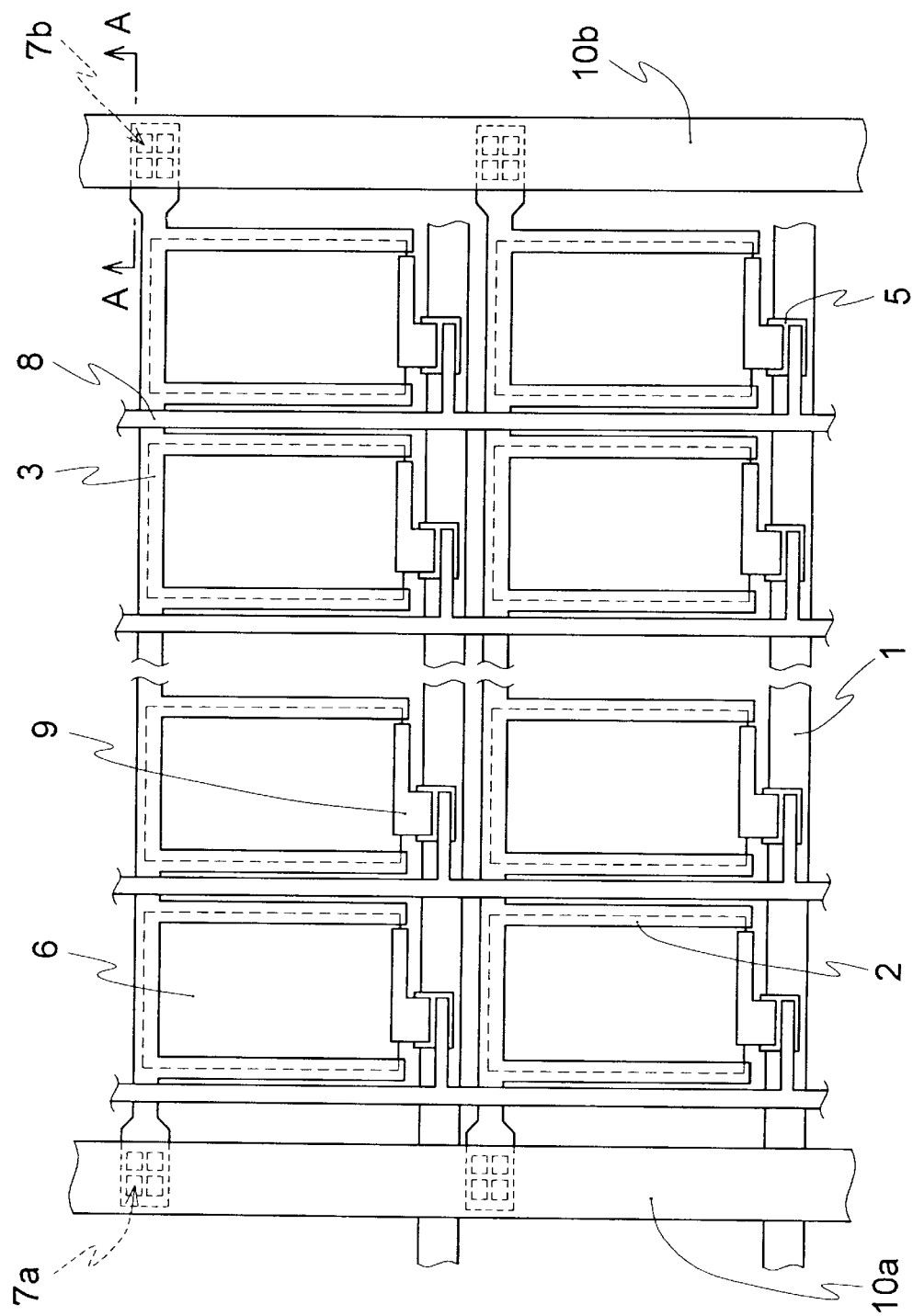
FIG. 1 is a plan view of the storage capacitance wiring group and collective drawing wiring of first embodiment of electrooptical element according to the present invention.
Figure 2:
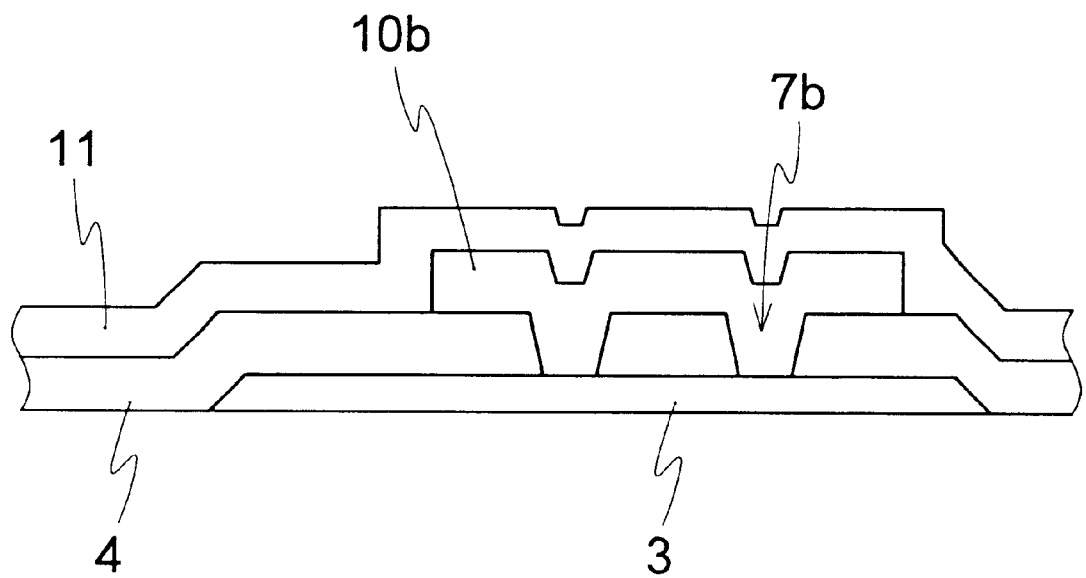
FIG. 2 is a sectional view seen from A—A direction of FIG. 1.

A plan view including collective drawing wiring, storage capacitance wiring group and pixel area according to Embodiment 1 is shown in FIG. 1, and a sectional view along line A—A of FIG. 1 is shown in FIG. 2. The manufacturing method according to the embodiment as claimed in claim 1 will now be explained in details. A glass substrate having a thickness of 0.7 mm is washed to purify its surface for use as an insulating substrate. In case the electrooptical elements are arranged to be of transparent type, it is general that the insulating substrate be transparent such as a glass substrate. In case the electrooptical elements are arranged to be of reflecting type, it is also possible to employ an insulating substrate that presents insulating characteristics substantially identical to those of a glass substrate. While the thickness of the insulating substrate may be arbitrarily selected, it is preferable to employ a substrate which thickness is approximately 0.7 mm or 1.1 mm in order to make the thickness of the electrooptical elements thin. In case the thickness of the insulating substrate is insufficient, drawbacks may be caused through distortions in the substrate owing to thermal hysteresis during various film forming and other processes, resulting in inferior patterning accuracy so that the thickness of the insulating substrate needs to be selected with regard to processes to be taken. Further, when employing an insulating substrate that is of brittle breakable material such as glass, it is preferable that chamfering of the edge surfaces of the substrate be performed for preventing contamination of foreign matters owing to chipping of edge surfaces. It is also preferable to provide a notch at a portion of the insulating substrate so that the direction of the substrate can be specified whereby the direction for treating the substrate can be specified for each of the processes so as to enable easy management of processes.

Then, a first metallic thin film is formed through methods such as spattering. The first metallic thin plate may be a thin film of Mo or an Al alloy such as AlZr or AlNd which thickness may be in a range between 100 nm to 300 nm. In case of using AlNd, the concentration of Nd may preferably be approximately 1 to 3 wt % in order to achieve low wiring resistance and to prevent generation of hillocks. It is also possible to employ as the first metallic thin film a metallic thin film of laminated dissimilar metals such as Cr/Al, Cr/Al or SiCu or a metallic thin film of which composition differs in the direction of the film thickness.

Then, the first metallic thin film is patterned in a first photolithographic/patterning process to form gate electrodes and wiring 1, storage capacitance electrodes 2 and storage capacitance wiring group 3. At this time, each of the storage capacitance wiring group is formed in a mutually separated condition.

In the description, the term "separation" denotes a case in which all of the storage capacitance wiring group 3 comprised of a plurality of wiring are separated both in an electrical and mechanical sense, and preferably a case in which each of the wiring are arranged at an interval of not less than 3 $\mu$m. The term "corrosion preventing treatment" as used in this specification can be defined as follows. In a condition in which each of the wiring are not mutually separated, the wiring potential is hardly varied owing to the large capacity of the whole wiring at the time of performing wet etching of the transparent conductive layer. Consequently, the potential difference between etching liquid that has penetrated into minute defect portions of the gate insulating film and the wiring metal becomes large so that the oxide film of the wiring metal surface and the wiring metal itself are corroded. On the other hand, in case separation of the wiring is performed, the capacity of the wiring metal becomes small whereby the potential difference between etching liquid that has penetrated into minute defect portions of the gate insulating film and the wiring metal can be maintained to be small, and even in case film deficits of a diameter of not more than 5 $\mu$m are present in the gate insulating film, no corrosion of the wiring is caused.

In the photolithographic process, the TFT array substrate is washed, applied with a photosensitive resist and dried, exposed through a mask pattern formed with a specified pattern, and developed so as to form a resist on the TFT array substrate on which the mask pattern has been transferred in a photolithographic manner. After heating and curing the photosensitive resist, etching as well as exfoliation of the photosensitive resist is performed. In case of using Mo, AlNd, AlZr, the etching of the first metallic film is performed through wet etching using an aqueous solution of phosphoric acid, acetic acid and nitric acid, while in case of Mo, dry etching using $CF_4$ and oxygen gas, or in case of AlNd and AlZr, dry etching using chlorine gas and oxygen gas is also applicable.

Thereafter, a first insulating film 4, semiconductor active film and ohmic contact film are successively formed through plasma CVD. The first insulating film 4 that serves as a gate insulating film may be a SiNx film, SiOx film, SiOxNy film or laminated films thereof. The thickness of the first insulating film is set to be in the range of approximately 300 nm and 600 nm. In case the film thickness of the insulating film is insufficient, shortage is apt to occur at an intersecting portion of the gate wiring and source wiring so that the film thickness is preferably selected to be not less than approximately the thickness of the first metallic thin film. Since the ON current of the TFTs become small in case the film thickness is thick so that the display characteristics are degraded, it is preferable to make the thickness small. The semiconductor active film may be an amorphous silicon film or a polycrystalline silicon film. The thickness of the semiconductor active film is set to be in the range of approximately 100 nm to 300 nm. In case the film thickness is small, the film thickness is selected based on the controllability of the depth at the time of performing dry etching of the ohmic contact film that will be discussed later and based on the required ON current for the TFTs. In case the semiconductor active film is an amorphous silicon film, it is preferable to employ a SiNx film or SiOxNy film at the interface between the gate insulating film and amorphous silicon film in view of the controllability of Vth of TFTs and reliability. In case the semiconductor active film is a polycrystalline silicon film, it is preferable to employ a SiOx film or SiOxNy film at the interface between the gate insulating film and polycrystalline silicon film in view of the controllability of Vth of TFTs and reliability. Further, in case the semiconductor active film is an amorphous silicon film, it is preferable to perform film forming under a condition in which the film forming rate is small in the proximity of the interface with the gate insulating film and in which the film forming rate is large in the upper portion of the layer, whereby it can be achieved for TFT characteristics presenting large mobility at a short film forming time and the leakage current of the TFTs in an OFF condition can be made small. The ohmic contact film may be a $n^+$ amorphous silicon film or $n^+$ polycrystalline silicon film in which amorphous silicon or polycrystalline silicon is doped with a minute amount of phosphorous. The thickness of the ohmic contact film is set to be in the range of approximately 20 nm to 70 nm. The above described SiNx film, SiOx film, SiOxNy film, amorphous silicon film, polycrystalline silicon film, $n^+$ amorphous silicon film and $n^+$ polycrystalline silicon film may be formed by using conventionally known gas.

In a second photolithographic/etching process, the semiconductor active film and ohmic contact film are pattered to form a semiconductor pattern 5 for a TFT portion. Etching of the semiconductor active film and ohmic contact film is performed through dry etching using, for instance, $SF_6$ and oxygen gas. A conductive thin film is then formed through methods such as spattering. In case the electrooptical elements are arranged to be of transparent type, the conductive thin film may be of ITO or $SnO_2$ with which a transparent conductive film can be obtained, wherein ITO is more preferable due to its chemical stability. The thickness of the conductive thin film is set to be in the range between 50 nm and 200 nm. Then, in a third photolithographic/etching process, patterning of the transparent conductive film is performed to form pixel electrodes 6. While a mixture acid of chloride and nitric acid is generally used for the etching of the transparent conductive film, it is also possible to use an aqueous solution of ferric chloride (iron trichloride). In the following fourth photolithographic/etching process, etching of the gate insulating film 4 is performed and there are respectively formed contact holes on a connecting portion 7a of the collective drawing wiring on the gate terminal side of the storage capacitance wiring group, a connecting portion 7b of the collective drawing wiring on the reverse side of the gate terminal, a gate wiring terminal connecting portion and source wiring terminal connecting portion. For forming the contact holes, dry etching using mixed gas of $CF_4$ and oxygen or mixed gas of $SF_6$ and oxygen is performed. Then, a Cr film is formed to a thickness of 400 nm, and in a fifth photolithographic/etching process, patterning of source wiring 8, drain electrodes 9, collective drawing wiring 10a on the gate terminal side and collective drawing wiring 10b on the reverse side of the gate terminal is performed. For the etching, a mixed acid of perchloric acid and secondary cerium nitrate ammon (diammonium cerium (IV) nitrate) is used. After patterning, the n+ amorphous silicon film or the n+ polycrystalline silicon film residing at a TFT channel portion is removed. A passivation film 11 is formed thereafter, followed by a sixth photolithographic/etching process in which driving IC connecting portions of the gate terminal and source terminal are exposed through dry etching using $CF_4$ and oxygen gas. In the above described processes, in case the storage capacitance wiring group is connected to the collective wiring as in the prior art, partial deficits of the gate insulating film will cause the etching liquid corrode the storage capacitance wiring group at the time of performing etching of pixel electrodes, whereby disconnection of the storage capacitance wiring group will occur. However, by forming the storage capacitance wiring group and the collective wiring in a mutually separated manner as indicated in claim 1, corrosion can be prevented even in case minute deficits exist in the gate insulating film.

The manufacturing method according to the present invention is especially effective in case the storage capacitance wiring group is formed of Al, an Al alloy or a multi-layered metal including at least one of them, since they are apt to be corroded at the time of performing etching of pixel electrodes.

Embodiment 2

Figure 3:
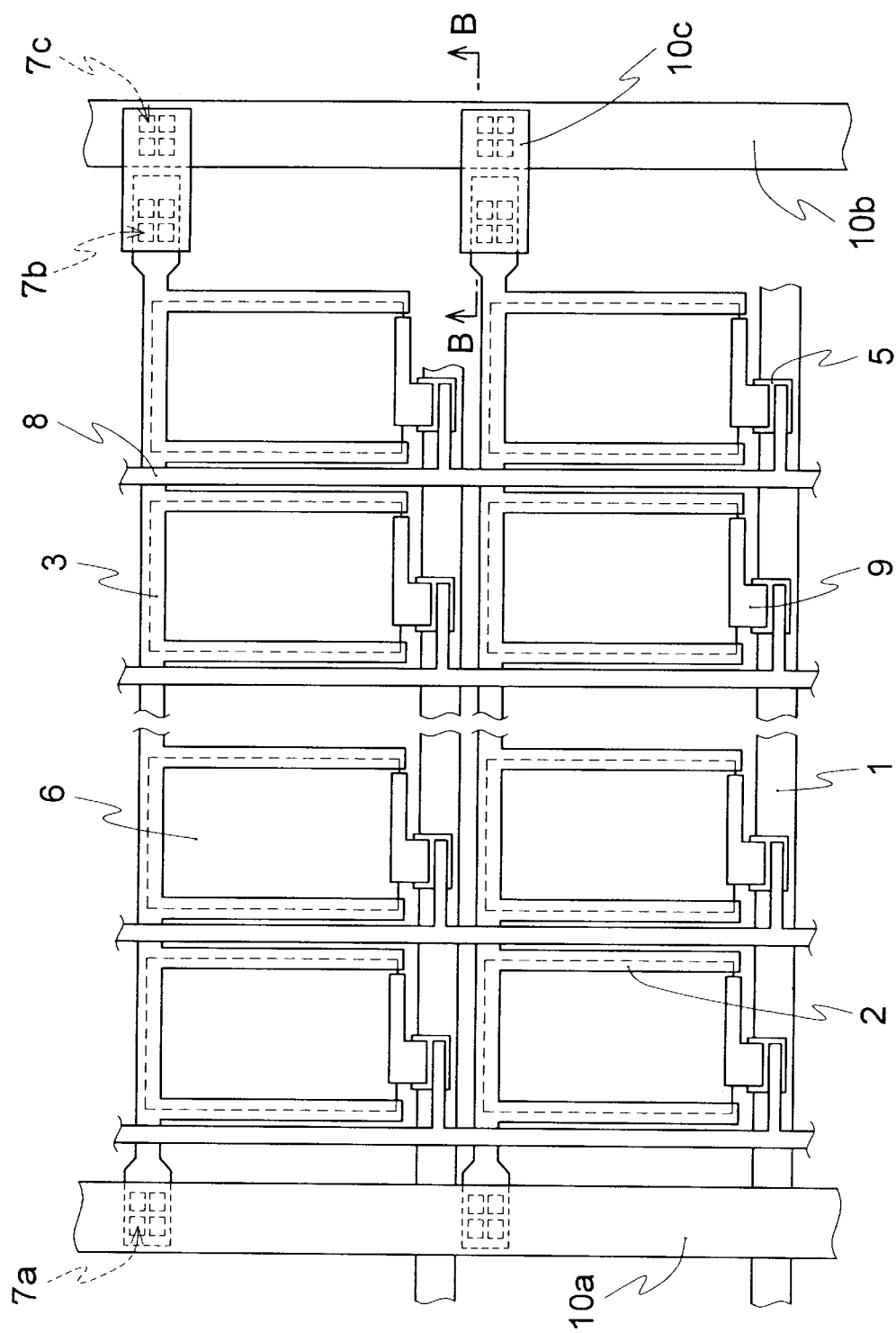
FIG. 3 is a plan view of the storage capacitance wiring group and collective drawing wiring of second embodiment of electrooptical element according to the present invention.
Figure 4:
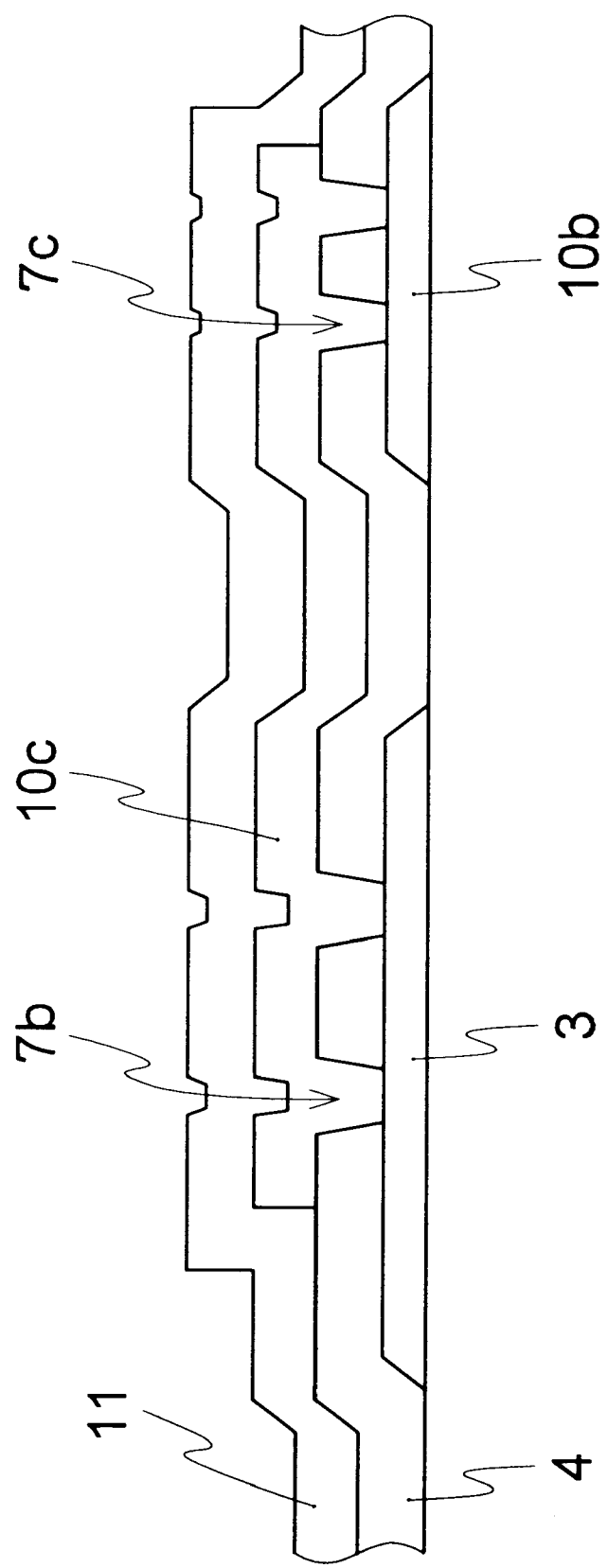
FIG. 4 is a sectional view seen from B—B direction of FIG. 3.

A plan view including collective drawing wiring, storage capacitance wiring group and pixel area according to Embodiment 2 is shown in FIG. 3, and a sectional view along line B—B of FIG. 3 is shown in FIG. 4. The manufacturing method according to the embodiment as is claimed in claim 2 will now be explained in details. It should be noted that explanations of processes of film forming, photolithographic processes and etching processes that are similar to those of Embodiment 1 will be omitted here. A first metallic thin film is formed through methods such as spattering. The first metallic thin film may be a thin film of Mo or an Al alloy such as AlZr or AlNd of which thickness may be in a range between 100 nm to 300 nm. In case of using AlNd, the concentration of Nd may preferably be approximately 1 to 3 wt % in order to achieve low wiring resistance and to prevent generation of hillocks. It is also possible to employ as the first metallic thin film a metallic thin film of laminated dissimilar metal such as Cr/Al, Cr/Al or SiCu or a metallic thin film of which composition differs in the direction of the film thickness. Then, the first metallic thin film is patterned in a first photolithographic/pattern process to form gate electrodes and wiring 1, storage capacitance electrodes 2, storage capacitance wiring group 3 and collective drawing wiring 10b on the reverse side of the gate wiring terminal. At this time, each of the storage capacitance wiring group 3 and collective drawing wiring 10b on the reverse side of the gate wiring terminal are respectively separated from each other. The film forming/photolithographic/etching processes that are performed at this time are similar to those of Embodiment 1. Thereafter, a first insulating film 4, semiconductor active film and ohmic contact film are successively formed through plasma CVD, and in a second photolithographic/etching process, a semiconductor pattern 5 of TFT portion is formed by performing patterning of the semiconductor active film and ohmic contact film onto the display pixels. The film forming/photolithographic/etching processes that are performed at this time are similar to those of Embodiment 1.

Then, a transparent conductive thin film is formed through methods such as spattering, and this transparent conductive film is patterned in a third photolithographic/etching process to obtain pixel electrodes 6. The film forming/photolithographic/etching processes that are performed at this time are similar to those of Embodiment 1. In the following fourth photolithographic/etching process, etching of the gate insulating film 4 is performed and there are respectively formed contact holes on a connecting portion 7a of the collective drawing wiring on the gate terminal side of the storage capacitance wiring group, an end portion 7b of the storage capacitance wiring group on the reverse side of the gate terminal, collective drawing wiring 7c on the reverse side of the gate terminal, a gate wiring terminal connecting portion, and source wiring terminal connecting portion. The film forming/photolithographic/etching processes that are performed at this time are similar to those of Embodiment 1. Then, a Cr film is formed to a thickness of 400 nm, and in a fifth photolithographic/etching process, patterning of source wiring 8, drain electrodes 9, collective drawing wiring 10a on the gate terminal side and a pattern 10c for connecting the collective drawing wiring 10b on the reverse side of the gate terminal and the storage capacitance wiring group 3 is performed. The film forming/photolithographic/etching processes that are performed at this time are similar to those of Embodiment 1. A passivation film 11 is formed thereafter, followed by a sixth photolithographic/etching process in which driving IC connecting portions of the gate terminal and source terminal are exposed. The film forming/photolithographic/etching processes that are performed at this time are similar to those of Embodiment 1. In the above described processes, in case the storage capacitance wiring group is connected to the collective wiring as in the prior art, partial deficits of the gate insulating film will cause the etching liquid corrode the storage capacitance wiring group at the time of performing etching of pixel electrodes, whereby disconnection of the storage capacitance wiring group will occur. However, by forming the storage capacitance wiring group and the collective wiring in a mutually separated manner as indicated in claim 2, corrosion can be prevented even in case minute deficits exist in the gate insulating film. Additionally, since the collective drawing wiring at the reverse side of the gate terminal is simultaneously formed when forming the storage capacitance wiring group, the collective drawing wiring 10b serves as an electrostatic shield with respect to static electricity generated at the time of manufacturing the electrooptical elements, whereby corruption of elements owing to electrostatic corruption during the manufacturing process can be prevented.

Embodiment 3

Figure 5:
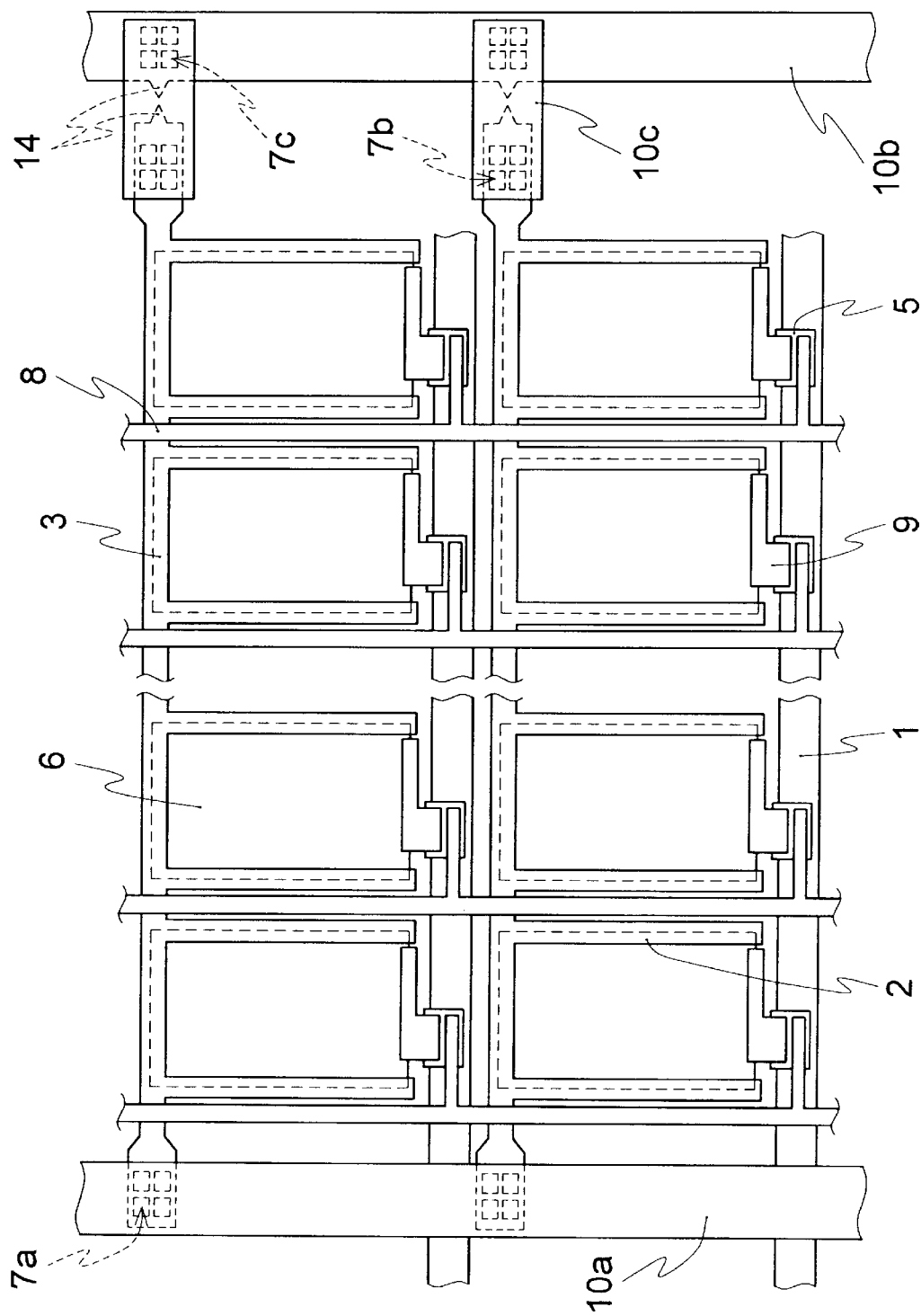
FIG. 5 is a plan view of the storage capacitance wiring group and collective drawing wiring of third embodiment of electrooptical element according to the present invention.

A plan view including collective drawing wiring, storage capacitance wiring group and pixel area according to Embodiment 3 is shown in FIG. 5. The manufacturing method according to Embodiment 3 will now be explained in details.

A first metallic thin film is formed on a glass substrate through methods such as spattering. The first metallic thin film may be a thin film of Mo or an Al alloy such as AlZr or AlNd which thickness may be in a range between 100 nm to 500 nm. In case of using AlNd, the concentration of Nd may preferably be approximately 1 to 3 wt % in order to achieve low wiring resistance and to prevent generation of hillocks. It is also possible to employ as the first metallic thin film a metallic thin film of laminated dissimilar metal such as Cr/Al, Cr/Al or SiCu or a metallic thin film of which composition differs in the direction of the film thickness.

Then, the first metallic thin film is patterned in a first photolithographic/pattern process onto gate electrodes and wiring 1, storage capacitance electrodes 2, storage capacitance wiring group 3 and collective drawing wiring 10b on the reverse side of the gate wiring terminal, and protruding patterns 14 are patterned on a portion facing the storage capacitance wiring group 3 and collective drawing wiring 10b on the reverse side of the gate wiring terminal. At this time, each of the storage capacitance wiring group and collective drawing wiring 10b on the reverse side of the gate wiring terminal are respectively separated from each other, and the protruding patterns 14 are formed through photolithographic processes to assume sizes enabling pattern separation and are arranged to be as close as possible with respect to each other. In view of mass productivity, the interval between these is preferably be approximately 3 to 4 μm. Thereafter, a first insulating film 4, semiconductor active film and ohmic contact film are successively formed through plasma CVD, and in a second photolithographic/etching process, a semiconductor pattern 5 of TFT portion is formed by performing patterning of the semiconductor active film and ohmic contact film onto the display pixels. The film forming/photolithographic/etching processes that are performed at this time are similar to those of Embodiment 1. Then, a transparent conductive thin film is formed through methods such as spattering, and this transparent conductive film is patterned in a third photolithographic/etching process to obtain pixel electrodes 6. The film forming/photolithographic/etching processes that are performed at this time are similar to those of Embodiment 1. In the following fourth photolithographic/etching process, etching of the gate insulating film 4 is performed and there are respectively formed contact holes on a connecting portion 7a of the collective drawing wiring on the gate terminal side of the storage capacitance wiring group, an end portion 7b of the storage capacitance wiring group on the reverse side of the gate terminal, a collective drawing wiring 7c on the reverse side of the gate terminal, a gate wiring terminal connecting portion, and source wiring terminal connecting portion. The film forming/photolithographic/etching processes that are performed at this time are similar to those of Embodiment 1. Then, a Cr film is formed to a thickness of 400 nm, and in a fifth photolithographic/etching process, patterning of source wiring 8, drain electrodes 9, collective drawing wiring 10a on the gate terminal side, pattern 10c for connecting the collective drawing wiring 10b on the reverse side of the gate terminal and the storage capacitance wiring group 3 is performed. The film forming/photolithographic/etching processes that are performed at this time are similar to those of Embodiment 1. A passivation film 11 is formed thereafter, followed by a sixth photolithographic/etching process in which driving IC connecting portions of the gate terminal and source terminal are exposed. The film forming/photolithographic/etching processes that are performed at this time are similar to those of Embodiment 1.

In the above described processes, in case the storage capacitance wiring group is connected to the collective drawing wiring as in the prior art, partial deficits of the gate insulating film will cause the etching liquid corrode the storage capacitance wiring group at the time of performing etching of pixel electrodes, whereby disconnection of the storage capacitance wiring group will occur, However, by forming the storage capacitance wiring group and the collective wiring in a mutually separated manner as indicated in claim 2, corrosion can be prevented even in case minute deficits exist in the gate insulating film. Additionally, since the collective drawing wiring at the reverse side of the gate terminal is simultaneously formed when forming the storage capacitance wiring group, the collective drawing wiring 10b serves as an electrostatic shield with respect to static electricity generated at the time of manufacturing the electrooptical elements, whereby corruption of elements owing to electrostatic corruption during the manufacturing process can be prevented.

Embodiment 3 is especially advantaged in that damages entering the collective drawing wiring 10b on the reverse side of the gate terminal and the storage capacitance wiring group 3 can be prevented even if static electricity should enter from the exterior into the collective drawing wiring on the reverse side of the gate terminal, since the energy of the static electricity can be consumed since discharge is performed between the protruding patterns 14.

Embodiment 4

Figure 6:
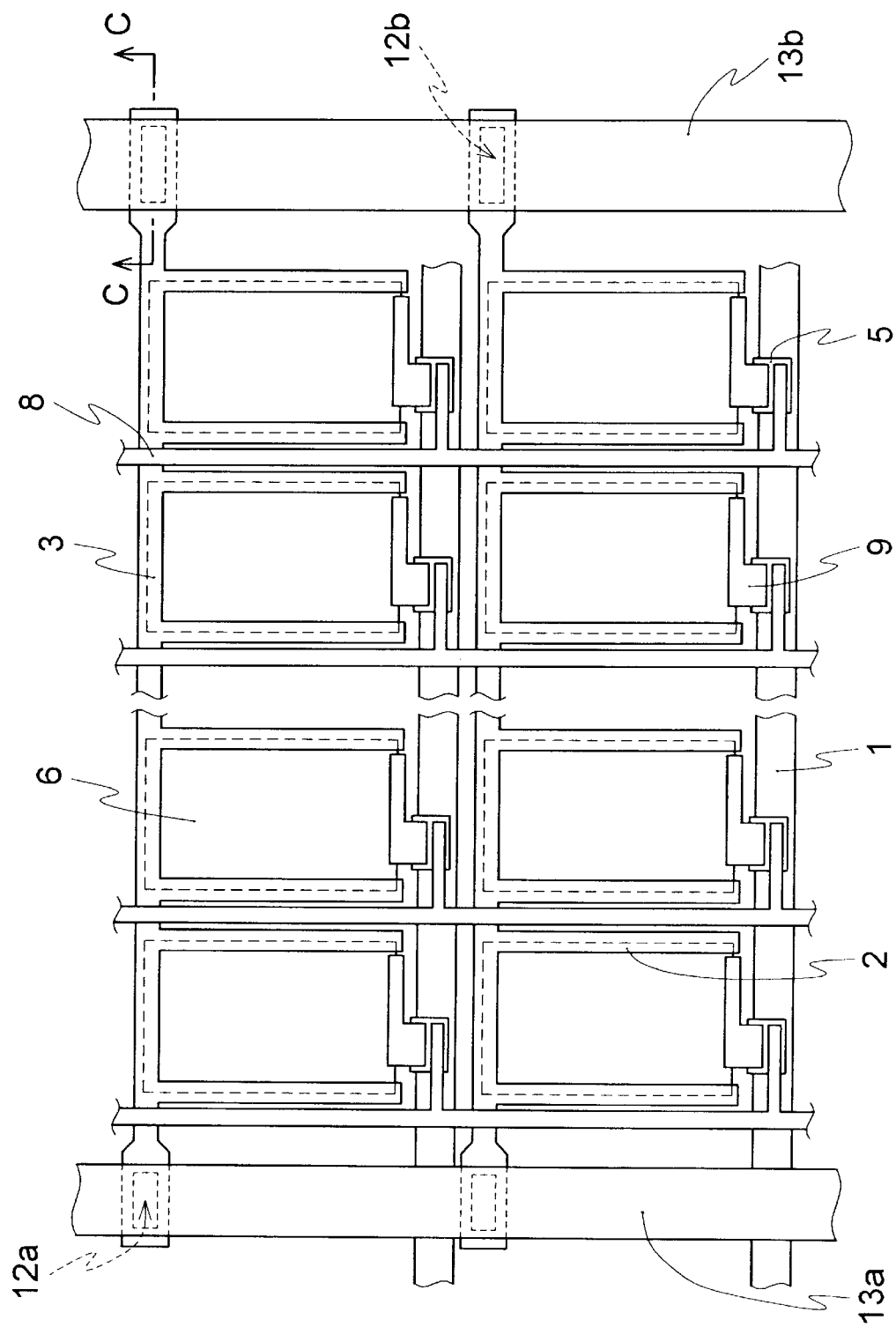
FIG. 6 is a plan view of the storage capacitance wiring group and collective drawing wiring of fourth embodiment of electrooptical element according to the present invention.
Figure 7:
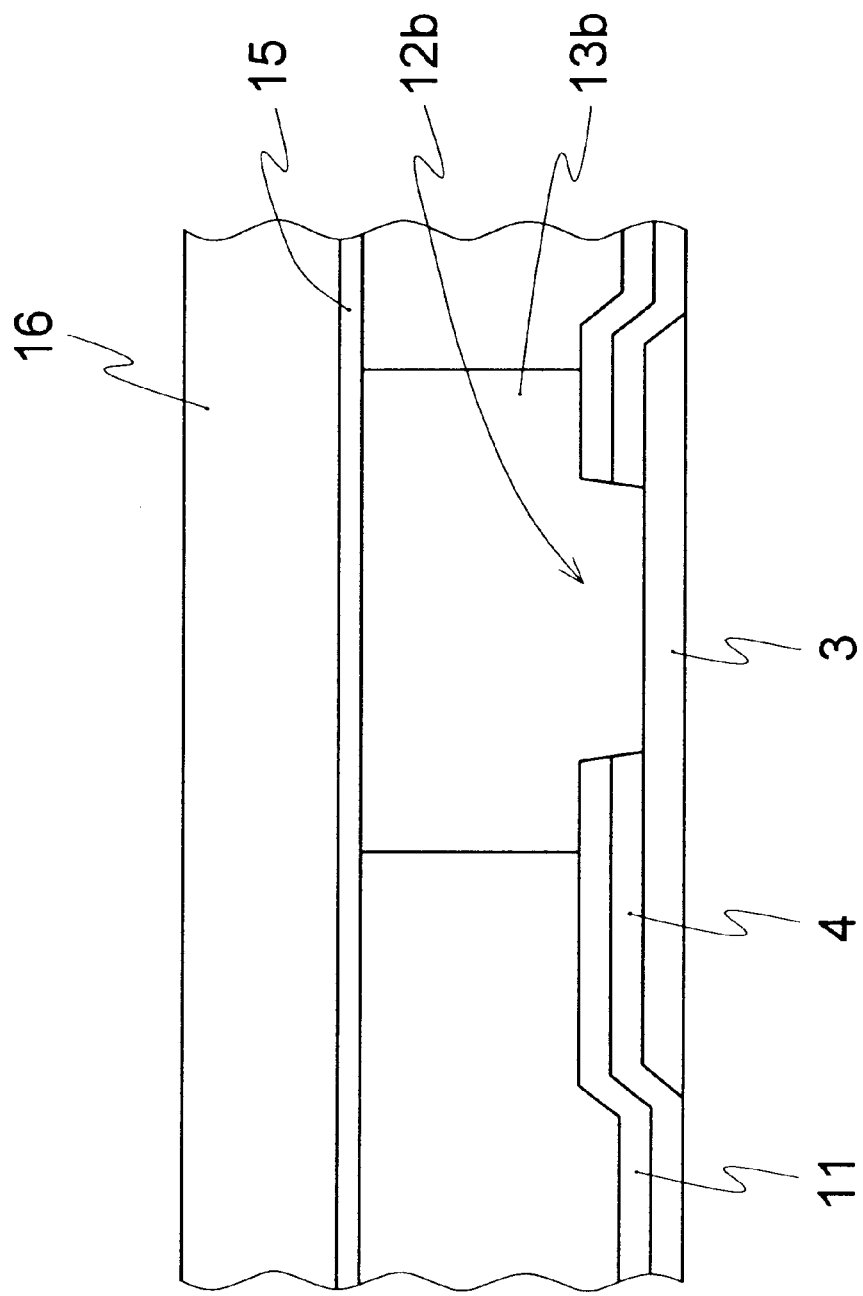
FIG. 7 is a sectional view seen from C—C direction of FIG. 6.
Figure 8:
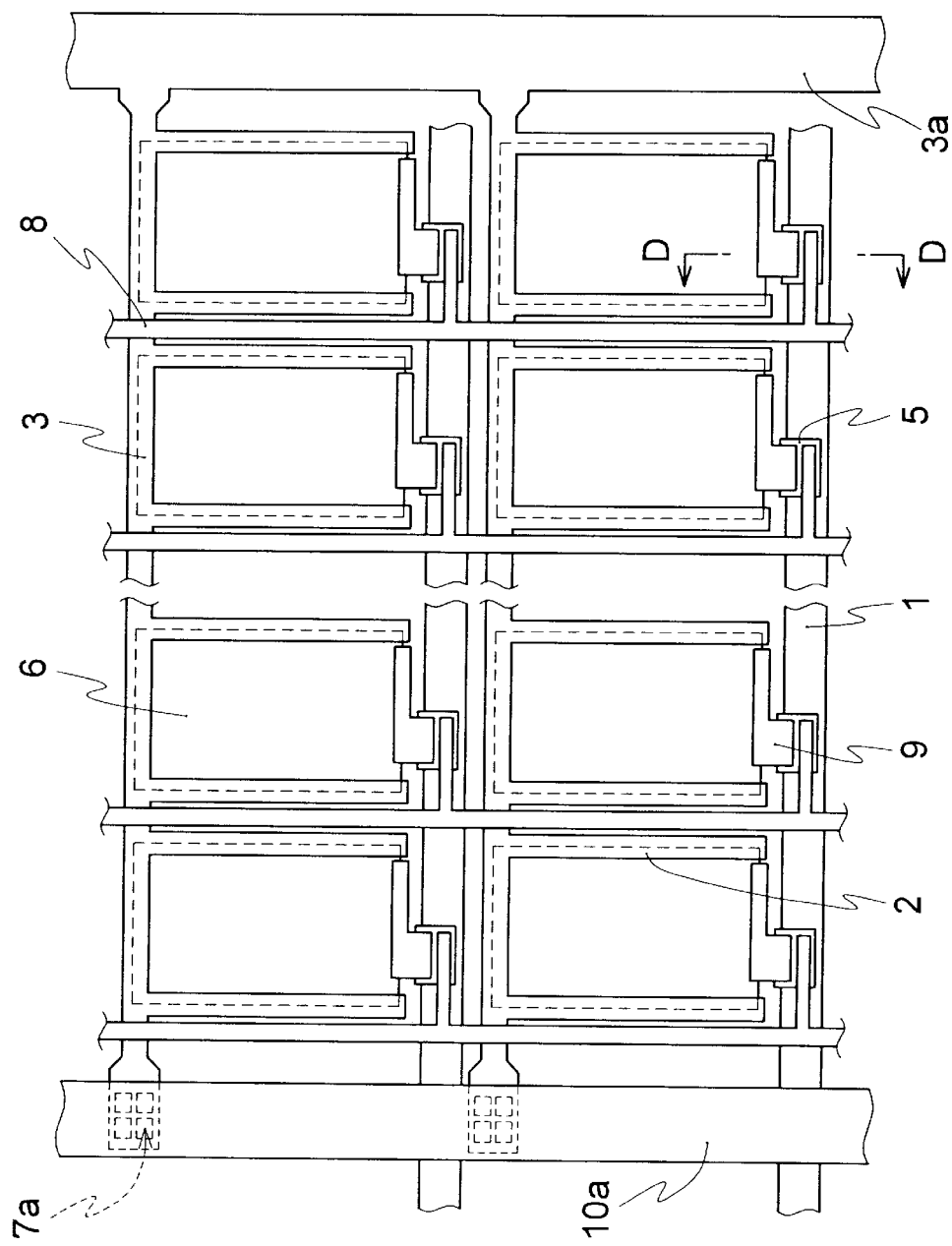
FIG. 8 is a plan view of the storage capacitance wiring group and collective drawing wiring of conventional electrooptical element.
Figure 9:
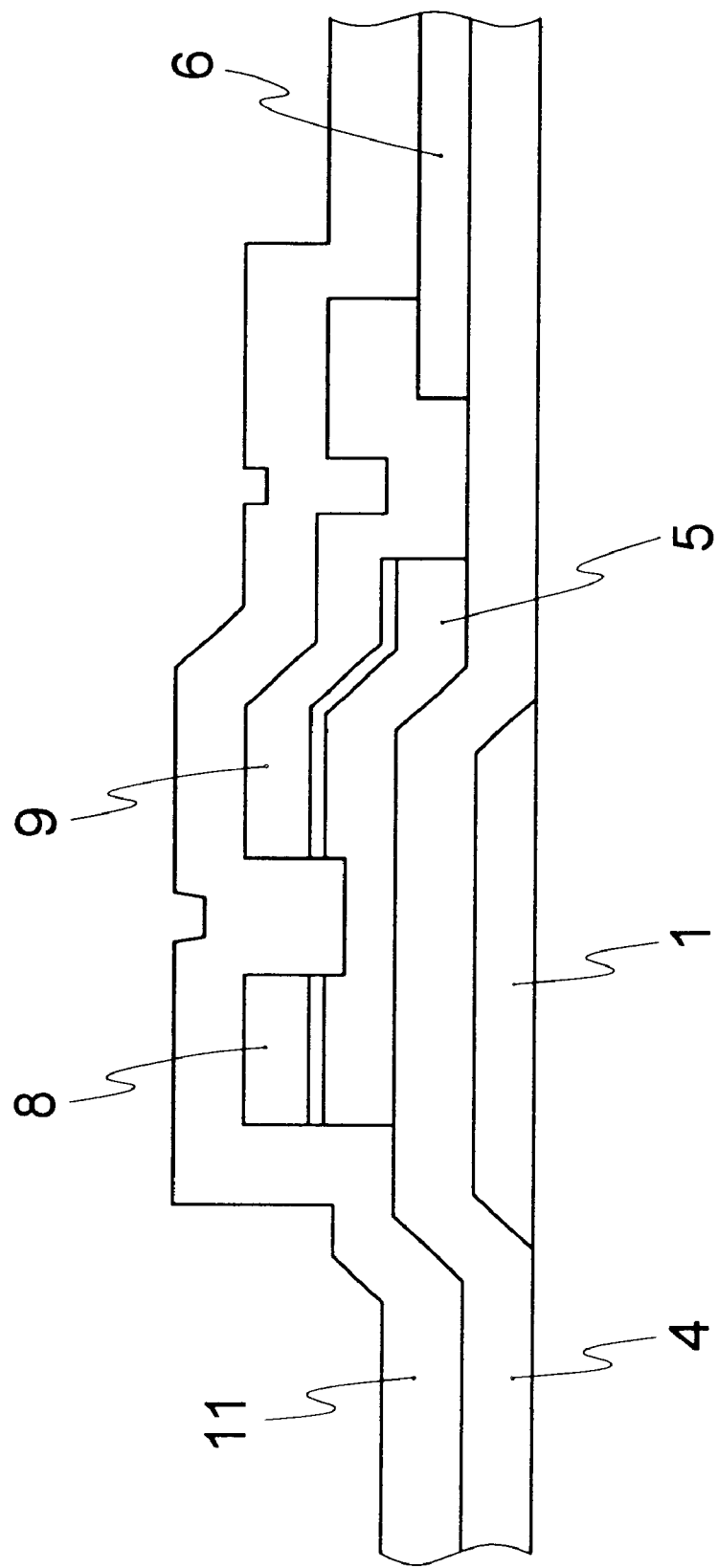
FIG. 9 is a sectional view seen from D—D direction of FIG. 8.
Figure 10:
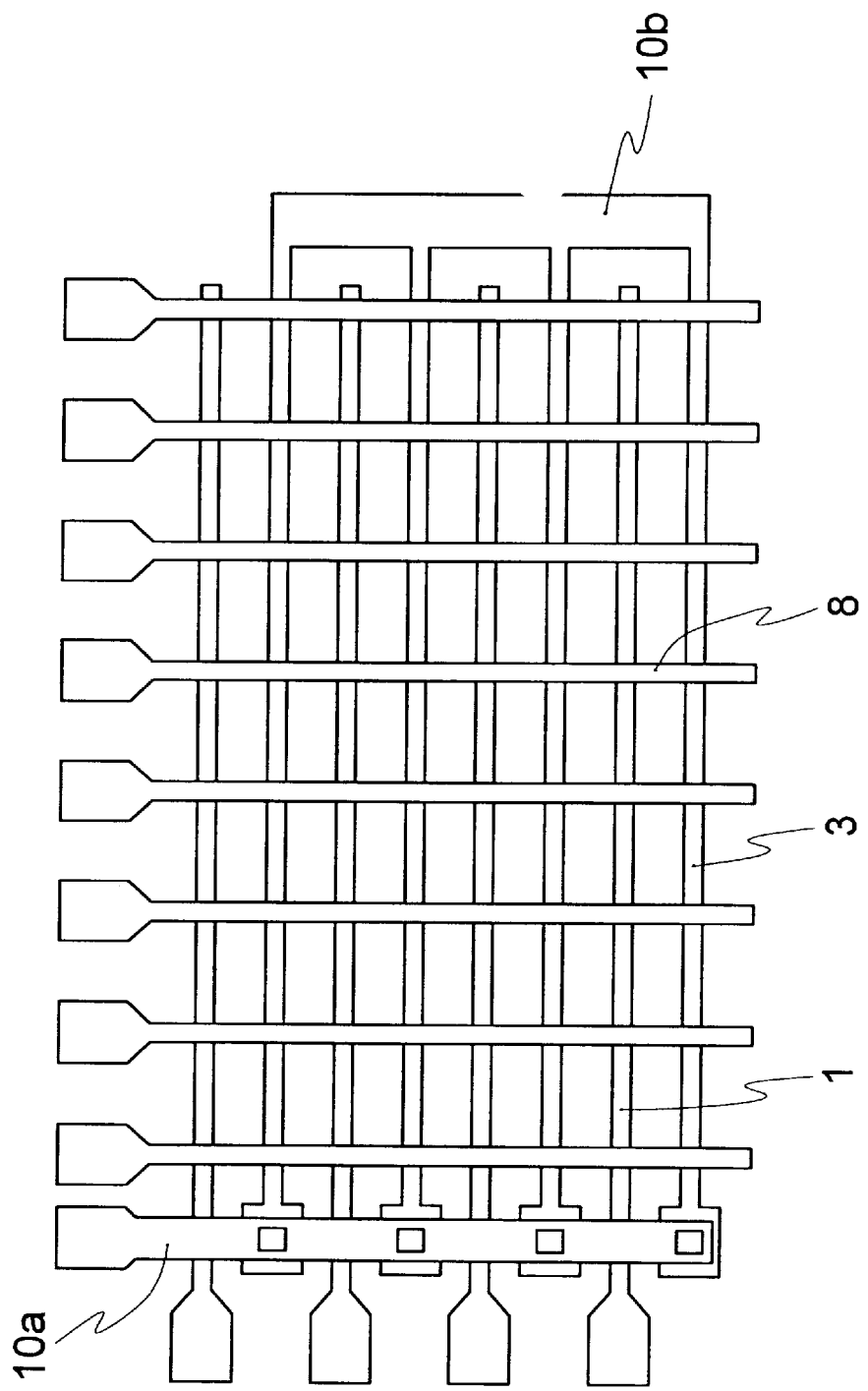
FIG. 10 is an illustrative diagram of a TFT substrate of an electrooptical element with storage capacitance wiring.

A plan view including collective drawing wiring, storage capacitance wiring group and pixel area according to Embodiment 4 is shown in FIG. 6, and a sectional view along line C—C of FIG. 6 is shown in FIG. 7. A first metallic thin film is formed on a glass substrate through methods such as spattering. The first metallic thin film may be a thin film of Mo or an Al alloy such as AlZr or AlNd of which thickness may be in a range between 100 nm to 500 nm. In case of using AlNd, the concentration of Nd may preferably be approximately 1 to 3 wt % in order to achieve low wiring resistance and to prevent generation of hillocks. It is also possible to employ as the first metallic thin film a metallic thin film wherein thin films of laminated dissimilar metal such as Cr/Al, Cr/Al or SiCu or a metallic thin film of which composition differs in the direction of the film thickness. Then, the first metallic thin film is patterned in a first photolithographic/pattern process to form gate electrodes and wiring 1, storage capacitance electrodes 2, storage capacitance wiring group 3. At this time, the storage capacitance wiring group 3 are all separated each other. The film forming/photolithographic/etching processes that are performed at this time are similar to those of Embodiment 1. Thereafter, a first insulating film 4, semiconductor active film and ohmic contact film are successively formed through plasma CVD, and in a second photolithographic/etching process, a semiconductor pattern 5 of TFT portion is formed by performing patterning of the semiconductor active film and ohmic contact film onto the display pixels. The film forming/photolithographic/etching processes that are performed at this time are similar to those of Embodiment 1.

Then, a transparent conductive thin film is formed through methods such as spattering, and this transparent conductive film is patterned in a third photolithographic/etching process to obtain pixel electrodes 6. The film forming/photolithographic/etching processes that are performed at this time are similar to those of Embodiment 1. In the following fourth photolithographic/etching process, etching of the gate insulating film 4 is performed and there are respectively formed contact holes on a gate wiring terminal connecting portion and source wiring terminal connecting portion. The film forming/photolithographic/etching processes that are performed at this time are similar to those of Embodiment 1. Then, a Cr film is formed to a thickness of 400 nm, and in a fifth photolithographic/etching process, patterning of source wiring 8 and drain electrodes 9 is performed. The film forming/photolithographic/etching processes that are performed at this time are similar to those of Embodiment 1. A passivation film 11 is formed thereafter, followed by a sixth photolithographic/etching process in which contact holes are formed on storage capacitance wiring group 12a on the gate terminal side and storage capacitance wiring group 12b on the reverse side of the gate terminal, and driving IC connecting portions of the gate terminal and source terminal are exposed. The film forming/photolithographic/etching processes that are performed at this time are similar to those of Embodiment 1. Thereafter, after performing transfer onto the TFT array substrate and opposing substrate, a transfer material for supplying opposing substrate potential onto the TFT substrate is dotted for forming transfer electrodes, and simultaneously, the transfer material is formed in a linear manner so as to cover the contact holes 12a and 12b formed on the storage capacitance wiring group, whereby collective drawing wiring 13a on the gate terminal side and collective drawing wiring 13b on the reverse side of the gate terminal are obtained. A generally used transfer material is silver particles mixed into an epoxy type adhesive. Thereafter, a sealing material is formed on the opposing substrate, the TFT substrate and opposing substrate are overlapped with each other, and through thermal curing of the sealing material, both substrates are adhered together. With this arrangement, corrosion of storage capacitance wiring group at the time of performing etching of pixel electrodes can be prevented. Also, since each of the storage capacitance wiring group are respectively separated from each other at the time the TFT array has been completed, it has been enabled to detect positions at which shortage between storage capacitance wiring group and gate lines as well as shortage between storage capacitance wiring group and source line has occurred which could so far not be detected through conventional electric deficiency tests. Moreover, it will also be possible to perform restoration of shortages at these defect portions by cutting using a laser tool.

As explained so far, it has been enabled through the inventions as claimed in claims 1 to 12 to apply materials that are apt to be corroded such as Al for use as storage capacitance wiring group, and to manufacture TFT array substrates free of corrosion and disconnection of wiring that may be generated during etching of pixel electrodes in case deficits such as coverage failure exist in the insulating film that is formed on the storage capacitance wiring group. While a natural oxidation film is formed on the surface of wiring of, for instance, Al, this natural oxidation film is dissolved in the presence of an etching liquid and a potential difference exceeding a specified extent at the time of performing etching of pixel electrodes, whereby the metal itself is corroded. In case each of the storage capacitance wiring group are respectively formed as to be separate from each other, it is considered that no corrosion occurs due to the small capacitance of wiring metal whereby the potential of the wiring is dragged by the etching liquid so that the potential difference between the etching liquid and wiring metal becomes small. On the other hand, it is presumed that in a condition in which the storage capacitance wiring group and collective drawing wiring are connected and etching of the pixel electrodes is performed, the total capacitance of wiring when performing etching of pixel electrodes becomes several hundreds to thousand times larger than that in case they are separated from each other, whereby a potential difference is generated between the etching liquid and wiring metal and consequently, the natural oxidation film and wiring are corroded.

What is claimed is:

1. An electrooptical element comprising:
    an electrooptical material interposed between a pair of substrates arranged in an opposing manner;
    wherein one of the substrates comprises thereon a gate wiring and storage capacitance wiring group including a plurality of wiring formed on a same layer as the gate wiring and formed of single-layered Al or Al alloy;
    a gate insulating layer formed on the substrate so as to cover the gate wiring and the storage capacitance wiring group;
    wherein during formation of the storage capacitance wiring group, all of the plurality of wiring in the storage capacitance wiring group are electrically and physically separated from each other such that the plurality of wiring have a substantially non-corroded surface after etching of a transparent conductive layer formed on the gate insulating layer;
    TFTs formed on the gate insulating layer;
    pixel electrodes electrically connected to the TFTs;
    source wiring intersecting with the gate wiring and provided on the substrate via the gate insulating layer; and
    collective drawing wiring formed on the gate insulating layer for mutually connecting said all of the plurality of wiring in the storage capacitance wiring group in an electrical manner through contact holes provided on the gate insulating layer.

2. An electrooptical element comprising:
    an electrooptical material interposed between a pair of substrates arranged in an opposing manner;
    wherein one of the substrates comprises thereon a gate wiring storage capacitance wiring group and collective drawing wiring formed on a same layer as the gate wiring and formed of one of corrosive metals or of a multi-layered metal including at least one of the corrosive metals;
    wherein during formation of the storage capacitance wiring group, the storage capacitance wiring group underwent corrosion preventing treatments;
    wherein the corrosion preventing treatments are electrical and physical separation within the storage capacitance wiring group;

a gate insulating layer formed on the substrate so as to cover the gate wiring;

the storage capacitance wiring group and the collective drawing wiring;

TFTs formed on the gate insulating layer;

pixel electrodes electrically connected to the TFTs;

source wiring intersecting with the gate wiring and provided on the substrate via the gate insulating layer; and a metallic pattern formed on the gate insulating layer for mutually connecting all of each of the storage capacitance wiring group and the collective drawing wiring in an electrical manner through contact holes provided on the gate insulating layer.

3. The electrooptical element of claim 2 characterized in that: the storage capacitance wiring group and the collective drawing wiring are made of Al, Al alloy or a multi-layered metal including at least one of them.

4. The electrooptical element of claim 2 characterized in that: a pattern is formed between the storage capacitance wiring group and the collective drawing wiring of facing to each other in a protruding manner.

5. A method for manufacturing electrooptical elements, comprising the steps of:

arranging a gate wiring on a substrate;

arranging a storage capacitance wiring group including a plurality of wiring formed of single-layered Al or Al alloy;

wherein during the formation of the storage capacitance wiring group, all of the plurality of wiring in the storage capacitance wiring group are electrically and physically separated from each other to provide a corrosion prevention treatment for a subsequent etching step of a transparent conductive layer;

forming a gate insulating layer on the substrate so as to cover the gate wiring and the storage capacitance wiring group;

forming contact holes on the gate insulating layer after performing wet etching of the transparent conductive layer;

arranging a source wiring which intersects with the gate wiring and is provided on the substrate at least via the gate insulating layer; and forming a collective drawing wiring on the substrate for mutually connecting said all of the plurality of wiring in the storage capacitance wiring group in an electrical manner through the contact holes.

6. A method for manufacturing electrooptical elements characterized in that:

there are respectively taken the steps of arranging a gate wiring on a substrate, arranging an storage capacitance wiring group and a collective drawing wiring formed of one of corrosive metals or of a multi-layered metal film including at least one of the corrosive metals;

wherein during formation of the storage capacitance wiring group, the storage capacitance wiring group underwent corrosion preventing treatments;

wherein the corrosion preventing treatments are electrical and physical separation within the storage capacitance wiring group;

forming a gate insulating layer on the substrate so as to cover the gate wiring;

the storage capacitance wiring group and the collective drawing wiring;

forming a transparent conductive layer on the gate insulating layer;

wherein there are further taken the steps of forming contact holes on the gate insulating layer after performing wet etching of the transparent conductive layer;

arranging a source wiring which intersects with the gate wiring and is provided on the substrate at least via the gate insulating layer; and arranging a metal pattern for mutually connecting all of each of the storage capacitance wiring group and the collective drawing wiring in an electrical manner through the contact holes.

7. The method for manufacturing electrooptical elements of claim 6 characterized in that the storage capacitance wiring group and the collective drawing wiring are made of Al, Al alloy or a multi-layered metal including at least one of them.

8. The method for manufacturing electrooptical elements of claim 6 characterized in that: it further includes the steps of arranging patterns that are formed in a protruding manner at one end portion of the storage capacitance wiring group; and further arranging protruding patterns at a portion of the collective drawing wiring facing the protruding pattern provided at the storage capacitance wiring group.

9. The electrooptical element of claim 2, wherein each of the wires in the storage capacitance wiring group are electrical and physically separated from each other by at least 3 $\mu$m during an etching process using the etching liquid.

10. The method for manufacturing electrooptical elements of claim 6, wherein each of the wires in the storage capacitance wiring group are electrical and physically separated from each other by at least 3 $\mu$m during an etching process using the etching liquid.

* * * * *